(12) United States Patent
Moschkowitz

(10) Patent No.: US 6,398,398 B1
(45) Date of Patent: Jun. 4, 2002

(54) LIGHTING DEVICE FOR OPERATIVE SITE WITHOUT CAST SHADOW

(75) Inventor: Jean-Pierre Moschkowitz, Nancy (FR)

(73) Assignee: JPM, Nancy (FR)

( * ) Notice: Subject to any disclaimer, the term of this patent is extended or adjusted under 35 U.S.C. 154(b) by 0 days.

(21) Appl. No.: 09/622,987
(22) PCT Filed: Feb. 18, 1999
(86) PCT No.: PCT/FR99/00360
§ 371 (c)(1),
(2), (4) Date: Oct. 13, 2000
(87) PCT Pub. No.: WO99/43980
PCT Pub. Date: Sep. 2, 1999

(30) Foreign Application Priority Data

Feb. 27, 1998 (FR) .............................. 98 02661

(51) Int. Cl.[7] .................................. A61B 1/06
(52) U.S. Cl. .................. 362/572; 362/551; 362/554; 362/558; 362/581; 362/804
(58) Field of Search ................. 362/572, 554, 362/556, 558, 560, 573, 522, 583, 580, 581, 804, 551; 385/90, 91

(56) References Cited

U.S. PATENT DOCUMENTS

| 3,701,896 | A | * | 10/1972 | Pate | 240/25 |
|---|---|---|---|---|---|
| 4,757,426 | A | | 7/1988 | Scheller et al. | 362/250 |
| 4,786,127 | A | | 11/1988 | Molnar | 350/96.1 |
| 5,497,295 | A | | 3/1996 | Gehly | 362/32 |
| 5,559,911 | A | * | 9/1996 | Forkner et al. | 38/33 |
| 5,613,752 | A | | 3/1997 | Vezard | 362/32 |
| 5,803,575 | A | * | 9/1998 | Ansems et al. | 362/32 |
| 5,820,253 | A | * | 10/1998 | Scholz | 362/267 |

FOREIGN PATENT DOCUMENTS

| DE | 2854684 | 2/1980 |
|---|---|---|
| DE | 29707661 | 7/1997 |
| EP | 0268117 | 5/1988 |
| FR | 2149368 | 3/1973 |

* cited by examiner

Primary Examiner—Sandra O'Shea
Assistant Examiner—Bertrand Zeade
(74) Attorney, Agent, or Firm—Gary M. Cohen

(57) ABSTRACT

A lighting device for an operational field of the "cast shadow" type, which is particularly useful for but not limited to field of dental surgery, includes a lighting head which is fed with light by at least one cord of optical fibers for directing the light produced by a light generator placed at a distance from the lighting head. The light generator is provided with a mechanical system for moving an inlet end piece of the cord away from or closer to a lamp which serves as the light generator. The lighting head is further configured to project the approximately rectangular light spot which is required for illuminating the operational field onto the work zone.

24 Claims, 3 Drawing Sheets

LIGHTING DEVICE FOR OPERATIVE SITE WITHOUT CAST SHADOW

The present invention concerns a lighting device for an operational field of the type without any cast shadow, particularly but not exclusively limited to the dental surgery field, including a lighting head fed with light by cords of optical fibres directing the light produced by a light generator.

There already exist lighting devices for limiting cast shadows. The devices most currently used in the medical or dental field are shadowless lamps® comprising a lighting head having a glass parabolic reflector associated with one or several lamps or sets of mirrors.

One of the drawbacks of shadowless lamps® is that their light source is located at the level of the lighting head and produces a quantity of heat in a work zone prejudicial for practicians and patients.

Another drawback of this type of lighting is its significant volume rendering it relatively bulky.

Systems have already been put forward for lighting a targeted zone fed by optical fibre and an off-set light source for limiting the heat given off at the level of the operational field. For example, in this respect one could cite the lighting device described in the patent FR 1 431 405. However, this device retains a relatively significant volume.

Moreover, it is unable to fully satisfy the need of localised lighting, especially in the dental field, namely obtaining a luminous zone, not circular but having an approximately rectangular shape.

The object of the present invention is to have a product able to obtain these performances whilst also reducing the amount of heat in the work zone.

In accordance with the invention, this result is obtained with a lighting device for an operational field of the cast shadow type, particularly but not exclusively limited for dental surgery, including a lighting head fed with light by at least one of the cords of optical fibres directing the light produced by a light generator placed at a certain distance from the lighting head, characterised in that the light generator comprises a mechanical system for moving away or bringing closer a start end piece of the cords with respect to a light generator lamp.

In addition, the lighting head comprises means to project onto the work zone an approximately rectangular light spot required for illuminating the operational field.

According to one variant, the lighting head comprises:
at the frontal portion, at least two rear flat face aspheric lenses arranged on both sides of the longitudinal axis of the lighting head and having an angular positioning a with respect to the longitudinal axis allowing convergence of the light issued at the outlet by the two lenses,
an optical fibre cord end directed perpendicular to the rear flat face of each aspheric lens, the optical fibres having at the fibre outlet at the level of the end an oblong-shaped section.

The angular positioning $\alpha$ with respect to the longitudinal axis is preferably about 5.5° and the distance between the frontal portion of the end and the flat rear face of each aspheric lens is about 35 mm.

Thus, the device of the invention is able to obtain a rectangular light spot with dimensions of 10×20 to 70 cm of the lighting head.

According to a second variant, the lighting head comprises a concave reflector receiving the light from an outlet end piece of an optical fibre cord and sending it towards the operational field.

The invention shall be more readily understood from a reading of the following description with reference to the accompanying drawings on which FIG. 1 is a skeleton diagram of a lighting system according to a first variant, FIG. 2 is a cutaway bottom view of a lighting head according to a first variant, FIG. 3 is a front view of the lighting head of FIG. 2, FIG. 4 is a diagrammatic of the top of the light generator, FIGS. 5a and 5b are respectively cutaway side and front views of a cord end of optical fibres, FIG. 6 is a cutaway top view of a lighting head according to a second variant, FIG. 7 is a perspective view of the light outlet and the reflector of the variant of FIG. 6.

Reference is first made to FIG. 1.

The lighting device for an operational field of the type without any cast shadow is made up of a lighting head (1), cords of optical fibres (2) for directing to the lighting head (1) the light produced by a light a generator (3) ) placed at a certain distance from the lighting head (1). By moving the light source away from the work zone, the use of the optical fibres makes it possible to significantly reduce the amount of heat and thus contribute in protecting the practician and patient.

FIGS. 2, 3, 5a and 5b represent a first variant of the lighting head (1).

The lighting head (1) consists of a housing (4) having possibly a trapezoidal shape, comprising at its frontal portion a lens support (5) made for example of a moulded, aluminium or composite material.

The lens support (5) comprises two housings (6) with shoulders (7) with a diameter of for example 45 mm in which two aspheric lens (8) with a flat rear face (11) are mounted having the same external diameter as the housing and fixed into the latter by means of glueing or by any other fixing element.

Advantageously, the aspheric lens made of glass for example could have an external diameter of 45 mm, a thickness of 15.7 mm and a focal distance of 42 mm.

The centre distance (E) of the housings (6) may be 140 mm with an angular positioning of each housing of about 5.5° with respect to the longitudinal axis (9) of the lighting head so as to allow the same angular positioning of the axes (21) of the aspheric lenses (8).

The lighting head further comprises an optical fibre cord end (10) directed perpendicular to the rear flat face (11) of each aspheric lens along the optical axis of the latter.

Each end (10) of the cord (2) is mounted in the lighting head (1) with the aid of fasteners (12) for orientating the end (10) in rotation and for positioning said elements angularly and in depth with respect to the lenses (8), said fasteners (12) further comprising pressure screws (not shown) for immobilising the ends after their positioning has been adjusted.

As shown on FIGS. 5a and 5b, the ends (10) of the optical fibre cord consist of a cylinder body (27) made of aluminium for example fitted with a central bore shaped so as to have partly at least one oblong section (20) for similarly shaping all the fibre outlets so as to produce a rectangular luminous spot with rounded angles at the level of the work zone.

The fastener elements made of machined aluminium are screwed onto a support (not shown) in the lighting head.

Each lens is associated at the lens inlet or outlet (see FIG. 2) with a filter (13) made of glass or PMMA with at least one hammered aspect relief face for correcting the aberration of the light rendered by said filters.

Each filter (13) is preferably placed as close as possible to the lens inlet (see FIG. 2) or outlet of the latter and shall be mechanically fixed to the lens support (5) by means of stapling, flanging or glueing.

Reference is now made to FIGS. 6 and 7 showing a second variant of the lighting head which comprises the same case (4) as in the first variant.

The optical fibre cord (2) arrives via the rear of the case and moves under a reflector (29) applied against the bottom and inside of the case.

The end of the optical fibre cord is bent back so that the end piece (30) comprising a "wide field" lens system (31) is directed towards the reflector (29).

Said reflector (29) has a specific peripheral shape, for example approximately rectangular measuring 10×20 cm and its surface is concave.

Said reflector (29) can be made of glass or polished metal or of plastic coated with any material reflecting the light so as to send the light to the front of the lighting head (1).

In this variant, the oval or rectangular shape of the luminous spot is given by the shape of the concave reflector (29).

By means of the system for positioning the start end pieces of the optical cords to be described subsequently, the light coming out of the outlet end pieces (30) no longer comprises rays IR to be eliminated and it is possible to use a simple reflecting material for the reflector and a simple glass pane (32) at the front of the head (instead of expensive dichroic glass).

The paragraphs which follow apply to the two embodiment variants.

Advantageously, a cord (2) is made up of a grating of optical fibres, such as about 80 fibres protected by a sheath (14) made for example of PVC, said sheath being nested and glued to one extremity in a cylindrical start end piece and the other in the end (10).

The fibres are preferably plastic optical fibres preferably made of PMMA having for example a diameter of 0.5 mm.

The specific choice of PMMA optical fibres makes it possible to keep a colour temperature of about 5400° K corresponding to an extremely white light which is not the case for glass optical fibres which tend to lower the colour temperature, the light becoming more yellow.

The fibre cord or the two fibre cords (2) comprise at the fibre inlet a given cylindrical start end piece (15) intended to be positioned at the outlet of the light generator (3).

The cylindrical end piece (15) preferably comprises machined grooves (22), for example preferably extremely closely placed grooves, said grooves making it possible to dissipate the heat produced by the light generator by using natural ventilation.

However, it is also possible to use other forms of ventilation for the cylindrical end piece.

The light generator (3) (see FIG. 4) preferably comprises a micro-discharge lamp (16) with an electronic ballast ellipsoid reflector (17) made for example of polished aluminium with a lamp with an output of 35 or 50 W, a voltage of 85 volts able to vary by ±20%.

The light generator comprises further an electronic item of equipment such as in its constitutive elements and which is not going to be described here.

The light generator further comprises an outlet (18) fitted with a machining part (19) for nesting the common start end piece (15) of the optical fibre cords (2) with a system for adjustment on two axes (23, 24) for alignment on the lamp, said part comprising a concentric bore with immobilisation means (not shown) of said end piece, such as a pressure screw placed transversally with respect to the machining part.

The positioning on two axes could also be effected directly at the level of the lamp. In this embodiment, the common start end piece of the cords would then remain fixed.

Advantageously, said machining part (19) comprises a mechanical system (not shown) making it possible to move away or move closer the common start end piece of the cords with respect to the lamp as indicated by the double arrow (25) so as to adjust the intensity of the luminous flow produced. Thus, it is possible to make the luminous flow vary from 5,000 to 25,000 lux by acting on the start end piece.

Advantageously, a filter (26) for protecting the optical fibres is inserted between the common start end piece (15) and the lamp (16), said filter being mounted for example in a metal support with spring flanging.

Said protection filter is thus able to protect the optical fibres from firstly ultraviolet rays which, over a period of time, can result in yellowing of the material of the optical fibres, and secondly from infrared rays, an excessively high temperature on the start end piece of the fibres possibly significantly altering the structure of the optical fibres, for example via the decomposition of resins used as a binder, or via the combustion of the PMMA fibres.

The protection filters can be made of glass or quartz with dimensions of 30×30 mm with a thickness of several millimetres.

Advantageously, a second filter (28) can be inserted between the common start end piece (15) and the lamp (16) so as to increase the colour temperature (for example so as to strengthen the "blues").

Advantageously, the lighting head and the generator are fixed with an articulated arm in which the optical fibre cords are positioned.

The entire system (namely the lighting head, the light generator, the articulated arm with the optical fibre cord) could be mounted on all types of support and in particular on all types of dental equipment in the same way as for example with conventional shadowless lamps®.

What is claimed is:

1. A lighting device for producing an operational field without any cast shadow, for use in fields including dental surgery, comprising a lighting head, a light generator having a lamp and placed at a distance from the lighting head, and at least one optical fiber cord for receiving and directing light produced by the light generator, wherein the cord includes an inlet end piece, and wherein the light generator includes a mechanical system coupling the light generator and the inlet end piece, for moving the inlet end piece of the cord closer and away from the lamp of the light generator.

2. The lighting device of claim 1 wherein the lighting head includes an outlet end piece associated with the optical fiber cord and configured to project an approximately rectangular luminous spot onto a work zone, for illuminating the operational field.

3. The lighting device of claim 2 wherein the optical cord has optical fibers, wherein the end of the optical cord defines a fiber outlet, and wherein the fiber outlet has an oblong-shaped section.

4. The lighting device of claim 2 wherein the lighting head has a frontal portion and a longitudinal axis, wherein the frontal portion includes at least two lenses placed on opposite sides of the longitudinal axis of the lighting head, and wherein the lenses have an angular positioning a with respect to the longitudinal axis, for causing a convergence of light issuing from the lenses.

5. The lighting device of claim 4 wherein the lenses are aspheric lenses.

6. The lighting device of claim 5 wherein each lens has a flat rear face, and wherein the optical cord has an end directed perpendicular to the flat rear face of the lens.

7. The lighting device of claim 6 wherein the end of the optical cord is mounted in the lighting head so that the end is oriented in rotation, and so that the depth and angular positioning of the end is fixed with respect to the lenses.

8. The lighting device of claim 7 wherein the optical cord is mounted in the lighting head by fasteners.

9. The lighting device of claim 6 wherein the angular positioning a is about 5.5° with respect to the longitudinal axis, and wherein the end of the optical cord is separated from the flat rear face of each aspheric lens by a distance of about 35 mm.

10. The lighting device of claim 4 wherein each lens further includes a filter for rectifying aberrations of light issuing from the lenses.

11. The lighting device of claim 10 wherein the filter is located at an inlet of the lens.

12. The lighting device of claim 10 wherein the filter is located at an outlet of the lens.

13. The lighting device of claim 1 wherein the lighting head includes a concave reflector for receiving the light from an outlet end piece associated with the optical fiber cord and for directing the light to the operational field.

14. The lighting device of claim 13 wherein the reflector is formed of a material selected from the group of materials consisting of polished metal, reflecting glass and coated plastic.

15. The lighting device of claim 13 wherein the reflector is approximately rectangular.

16. The lighting device of claim 13 wherein the outlet end piece includes a wide field lens system.

17. The lighting device of claim 1 wherein the inlet end piece is cylindrical and wherein the cylindrical end piece has machined heat dissipation grooves.

18. The lighting device of claim 1 wherein the light generator includes a micro-discharge lamp with an electronic ballast and an ellipsoid reflector.

19. The lighting device of claim 1 wherein the light generator further includes an outlet provided with a machining part for receiving the inlet end piece, and wherein the machining part is adjustable along two axes relative to the lamp.

20. The lighting device of claim 19 wherein the machining part further includes a concentric bore with means for immobilizing the inlet end piece.

21. The lighting device of claim 10 wherein the machining part includes the mechanical system for moving the inlet end piece associated with the cord closer and away from the lamp of the light generator.

22. The lighting device of claim 1 which further includes a first filter for protecting the optical fibers inserted between the inlet end piece and the lamp.

23. The lighting device of claim 1 which further includes a second filter for raising the color temperature inserted between the inlet end piece and the lamp.

24. The lighting device of claim 1 wherein the optical fibers are plastic fibers.

* * * * *

UNITED STATES PATENT AND TRADEMARK OFFICE
CERTIFICATE OF CORRECTION

PATENT NO.   : 6,398,398 B1
DATED        : June 4, 2002
INVENTOR(S)  : Jean-Pierre Moschkowitz It is certified that error appears in the above-identified patent and that said Letters Patent is hereby corrected as shown below:

Columns 1-4 should be deleted to appear as per attached columns 1-4.

Signed and Sealed this

Third Day of February, 2004

JON W. DUDAS
*Acting Director of the United States Patent and Trademark Office*

LIGHTING DEVICE FOR OPERATIVE SITE WITHOUT CAST SHADOW

BACKGROUND OF THE INVENTION

The present invention relates to a lighting device for an operational field which does not cast any shadow, which is particularly useful for but not limited to the field of dental surgery. The lighting device generally includes a lighting head which is fed with light by cords of optical fibers for directing the light produced by a light generator.

Lighting devices for limiting cast shadows are known. The devices currently most commonly used in the medical or dental field are "shadowless lamps®". Such lamps include a lighting head having a glass parabolic reflector associated with one, or several lamps, or sets of mirrors.

One of the drawbacks of "shadowless lampse" is that their light source is located at the level of the lighting head, producing a quantity of heat in the work zone which is prejudicial for practitioners and patients. Another drawback of this type of lighting is its significant volume, which renders it relatively bulky.

Systems have been proposed for lighting a targeted zone fed by optical fibers using an off-set light source for limiting the heat given off at the level of the operational field. One such example is the lighting device described in French Patent No. 1 431 405. However, the disclosed device retains the disadvantage of having a relatively significant volume. Moreover, the disclosed device is unable to fully satisfy the requirement for localized lighting. Localized lighting is especially needed in the dental field, to obtain a luminous zone which is not circular, but which has an approximately rectangular shape.

The object of the present invention is to provide a device which is able to achieve such performance while also reducing the amount of heat in the work zone.

SUMMARY OF THE INVENTION

This is achieved with a lighting device for an operational field of the "cast shadow" type, which is particularly useful for but not limited to the field of dental surgery, and which includes a lighting head which is fed with light by at least one cord of optical fibers for directing the light produced by a light generator placed at a certain distance from the lighting head. In accordance with the invention, the light generator comprises a mechanical system for moving an inlet end piece of the cord away from or closer to a lamp which serves as the light generator. The lighting head further comprises means for projecting an approximately rectangular light spot, required for illuminating the operational field, onto the work zone.

In a first embodiment, frontal portions of the lighting head include at least two aspheric lenses having flat rear faces. The lenses are arranged on both sides of the longitudinal axis of the lighting head and have an angular positioning α with respect to the longitudinal axis, allowing convergence of the light issued at the outlet by the two lenses. The end of an optical fiber cord is directed perpendicular to the flat rear face of each aspheric lens, and the ends of the optical fibers have an oblong-shaped section at the outlet end.

The angular positioning a with respect to the longitudinal axis of the lighting head is preferably about 5.5°, and the distance between the frontal portion and the flat rear face of each aspheric lens is about 35 mm. Such a lighting head is able to develop a rectangular spot of light with dimensions of 10 cm×20 to 70 cm.

In a second embodiment, the lighting head has a concave reflector which receives light from an outlet end piece of an optical fiber cord, for direction toward the operational field.

The invention is further described below, with reference to the following drawings.

DETAILED DESCRIPTION OF THE INVENTION

Figure 1:
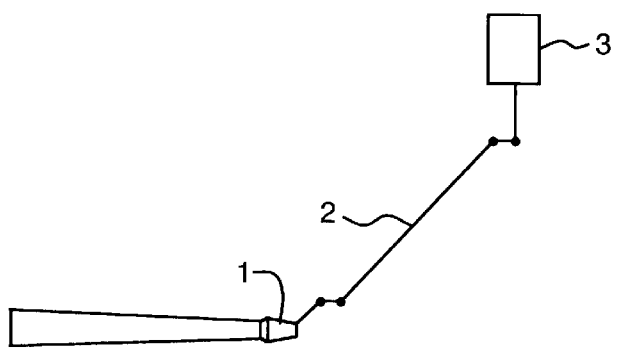
FIG. 1 is a schematic diagram of a first embodiment of the lighting system of the present invention.

FIG. 1 shows a lighting device for producing an operational field without any cast shadow which is made up of a lighting head (1), a light generator (3) placed at a distance from the lighting head (1), and a cord (or cords) of optical fibers (2) for directing light produced by the light generator (3) to the lighting head (1). By moving the light source away from the work zone, the use of optical fibers makes it possible to significantly reduce the amount of heat, thereby assisting in protecting the practitioner and the patient.

FIGS. 2, 3, 5A and 5B show a first embodiment of the lighting head (1). In this configuration, the lighting head (1) is received in a housing (4), which can have a trapezoidal shape. The frontal portion of the housing (14) includes a lens support (5) made, for example, of a molded, aluminum or composite material.

The lens support (5) includes two housings (6) with shoulders (7) having a diameter of, for example, 45 mm. The shoulders (7) each receive an aspheric lens (8) with a flat rear face (11) and having the same external diameter as the housing (6) which receives it. The lens (8) can be fixed to the housing (6) by a glue or by any other fixing element.

As an example, the aspheric lens is advantageously made of glass, having an external diameter of 45 mm, a thickness of 15.7 mm and a focal distance of 42 mm. The distance (E) between the centers of the housings (6) can be 140 mm, with an angular positioning of each housing of about 5.5° with respect to the longitudinal axis (9) of the lighting head (1) so as to allow the same angular positioning of the axes (21) of the aspheric lenses (8).

The lighting head further receives an end (10) of each optical fiber cord (2), which is directed perpendicular to the flat rear face:(11) of each aspheric lens (8) along its optical axis (21). Each end (10) of the cord (2) is mounted in the lighting head (1), with the aid of fasteners (12), for orienting the end (10), in rotation, and for positioning such elements at an angle and at a depth with respect to the lenses (8). The fasteners (12) are made of machined aluminum and are screwed onto a support (not shown) in the lighting head (1). The fasteners (12) further include pressure screws (not shown) for immobilizing the ends (10) after their positioning has been adjusted.

Figure 5A:
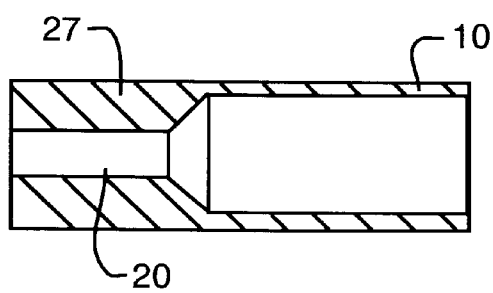
FIG. 5A is a longitudinal cross-sectional view of a cord end for receiving the optical fibers.
Figure 5B:
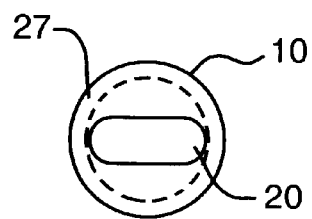
FIG. 5B is a transverse cross-sectional view of the cord end of FIG. 5A.

As shown in FIGS. 5A and 5B, the ends (10) of the optical fiber cord (2) include a cylinder body (27), made of aluminum for example. The cylinder body (27) is fitted with a central bore which is shaped so that at least portions of the bore have an oblong section (20) for similarly shaping all of the fiber outlets, producing a rectangular luminous spot with rounded angles at the level of the work zone.

Figure 2:
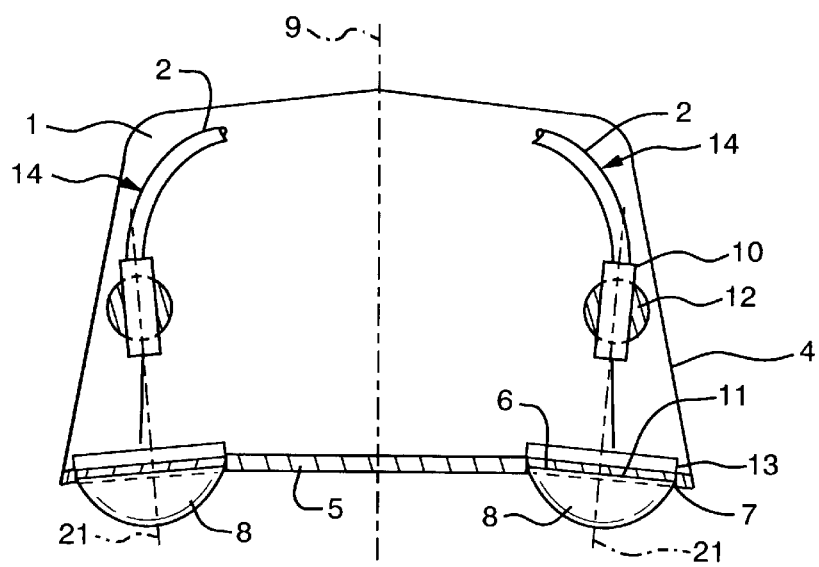
FIG. 2 is a cross-sectional view of a lighting head for the first embodiment of FIG. 1.
Figure 3:
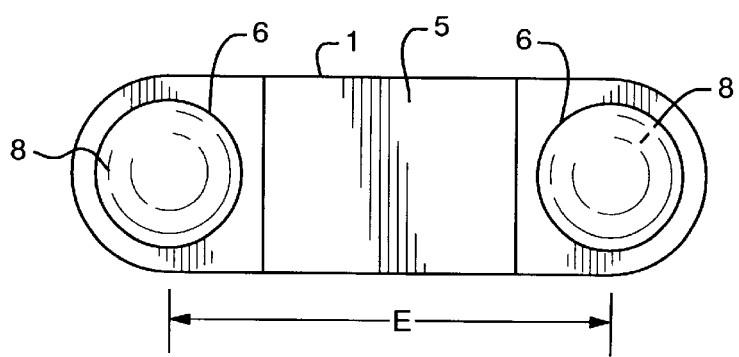
FIG. 3 is a front view of the lighting head of FIG. 2.

Referring to FIG. 2, each lens (8) is associated (at the lens inlet or outlet) with a filter (13) made of glass or PMMA, with at least one hammered aspect relief face for correcting aberration of the light rendered by the filters. Each filter (13) is preferably placed as close as possible to the inlet or outlet of the lens, and is mechanically fixed to the lens support (5) by means such as stapling, flanging or gluing.

Figure 6:
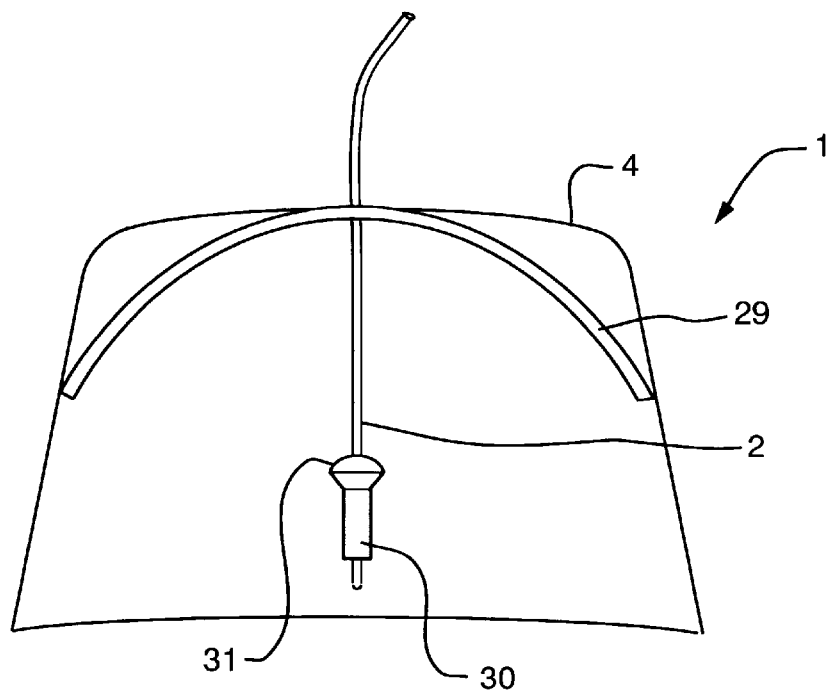
FIG. 6 is a cross-sectional view of a second embodiment of the lighting head.
Figure 7:
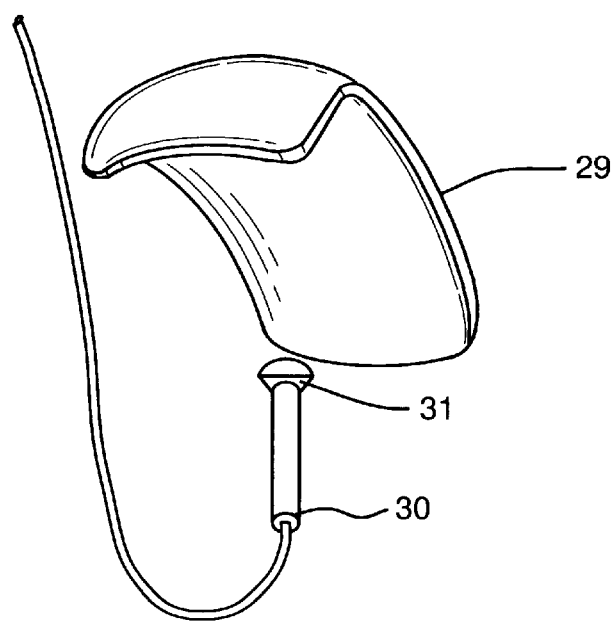
FIG. 7 is an isometric view of the light outlet and the reflector of the second embodiment of FIG. 6.

FIGS. 6 and 7 show a second embodiment of the lighting head (1), which includes the same case (4) as in the first embodiment. In this second embodiment, the optical fiber cord (2) enters the rear of the case (4) and moves under a reflector (29) which is applied against the bottom and inside of the case. The end of the optical fiber cord is bent back so that the end piece (30), which includes a "wide field" lens system (31), is directed toward the reflector (29).

The reflector (29) has a specific peripheral shape which, as an example, is approximately rectangular, measuring 10 cm×20 cm, and a concave surface. The reflector (29) can be made of glass, polished metal or of plastic, coated with any material for reflecting light so as to send the light to the front of the lighting head (1). In this embodiment, the oval or rectangular shape of the luminous spot is given by the shape of the concave reflector (29).

Using a system for positioning the inlet end pieces of the optical cords, to be described subsequently, the light coming from the outlet end piece (30) no longer includes IR rays, which need to be eliminated, and it is possible to use a simple reflecting material for the reflector and a simple glass pane (32) at the front of the head (instead of expensive dichroic glass).

For each of the two embodiments described previously, the cord (2) is made up of a grating of optical fibers (for example, about 80 fibers) protected by a sheath (14) made, for example, of PVC. The sheath is nested and glued at one extremity in a cylindrical inlet end piece and at the other in the end (10).

The fibers are preferably plastic optical fibers, and are preferably made of PMMA having, for example, a diameter of 0.5 mm. The specific choice of PMMA optical fibers makes it possible to keep a color temperature of about 5400° K, corresponding to an extremely white light, which is not the case for glass optical fibers, which tend to lower the color temperature, causing the light to become more yellow.

The fiber cord or the two fiber cords (2) have, at the fiber inlet, a cylindrical inlet end piece (15) which is intended to be positioned at the outlet of the light generator (3). The cylindrical end piece (15) preferably has machined grooves (22), which are preferably extremely closely placed. The grooves make it possible to dissipate the heat produced by the light generator using natural ventilation. It is also possible to use other forms of ventilation for the cylindrical end piece.

Figure 4:
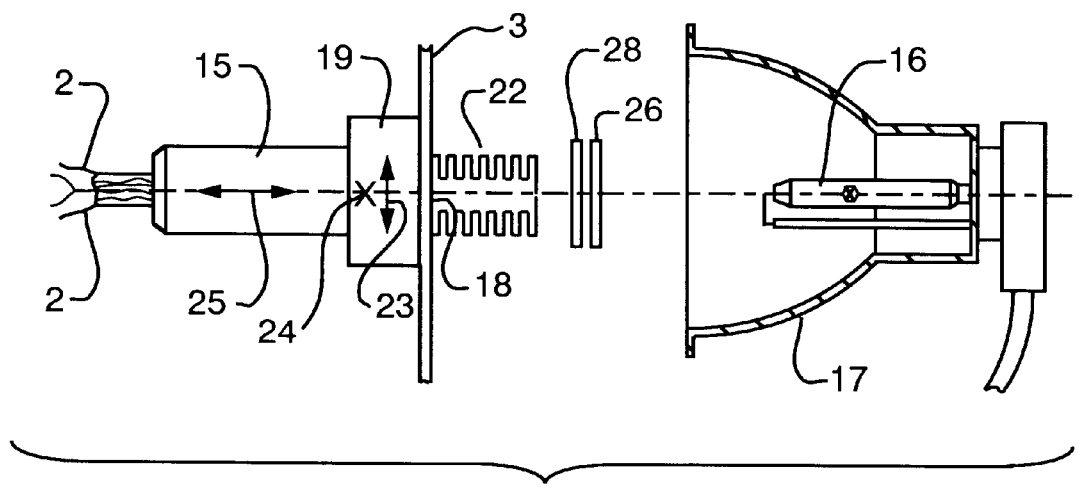
FIG. 4 is an exploded view of the top of the light generator.

The light generator (3) is shown in FIG. 4, and preferably includes a micro-discharge lamp (16) with an electronic ballast and an ellipsoid reflector (17). The reflector (17) is made, for example, of polished aluminum. The lamp, as an example, has an output of 35 or 50 W and a voltage of 85 volts, which can vary by ±20%. The light generator further includes, as its constitutive elements, suitable electronic equipment for its operation, which are not further described herein.

The light generator further has an outlet (18) fitted with a machining part (19) for nesting the common inlet end pieces (15) of the optical fiber cords (2) with a system for position adjustment on two axes (23, 24), for alignment on the lamp. The machining part (19) includes a concentric bore with means (not shown) for immobilizing the end piece, such as a pressure screw placed transversely with respect to the machining part. Positioning of the machining part (19) on two axes could also be effected directly, at the level of the lamp. In such an embodiment, the common inlet end piece of the cords would then remain fixed.

Advantageously, the machining part (19) includes a mechanical system (not shown) making it possible to move the common inlet end piece of the cords farther or closer with respect to the lamp, as indicated by the double arrow (25), to adjust the intensity of the luminous flow produced. It is possible to make the luminous flow vary from 5,000 to 25,000 lux by acting on the inlet end piece.

Advantageously, a filter (26) for protecting the optical fibers is inserted between the common inlet end piece (15) and the lamp (16). The filter is mounted, for example, in a metal support with a spring flanging. The protection filters can be made of glass or quartz, with dimensions of 30 mm×30 mm and with a thickness of several millimeters.

The protection filter is in this way able to protect the optical fibers, firstly from ultraviolet rays which, over a period of time, can result in yellowing of the material of the optical fibers, and secondly from infrared rays, which can result in an excessively high temperature on the inlet end piece for the fibers, possibly significantly altering the structure of the optical fibers, for example, through decomposition of the resins used as a binder, or through combustion of the PMMA fibers.

Advantageously, a second filter (28) can be inserted between the common inlet end piece (15) and the lamp (16) to increase the color temperature (for example, to strengthen the "blues").

Advantageously, the lighting head and the generator are fixed with an articulated arm for positioning the optical fiber cords.

The entire system (namely the lighting head, the light generator and the articulated arm with the optical fiber cord) can be mounted on all types of supports, and in particular, on all types of dental equipment, in the same way as, for example, as are conventional "shadowless lamps®".

What is claimed is:

1. A lighting device for producing an operational field without any cast shadow, for use in fields including dental surgery, comprising a lighting head, a light generator having a lamp and placed at a distance from the lighting head, and at least one optical fiber cord for receiving and directing light produced by the light generator, wherein the cord includes an inlet end piece, and wherein the light generator includes a mechanical system coupling the light generator and the inlet end piece, for moving the inlet end piece of the cord closer and away from the lamp of the light generator.

2. The lighting device of claim 1 wherein the lighting head includes an outlet end piece associated with the optical fiber cord and configured to project an approximately rectangular luminous spot onto a work zone, for illuminating the operational field.

3. The lighting device of claim 2 wherein the optical cord has optical fibers, wherein the end of the optical cord defines